H. B. TURNER.
TRACTION WHEEL TREAD.
APPLICATION FILED JUNE 13, 1921.
1,413,204.
Patented Apr. 18, 1922.
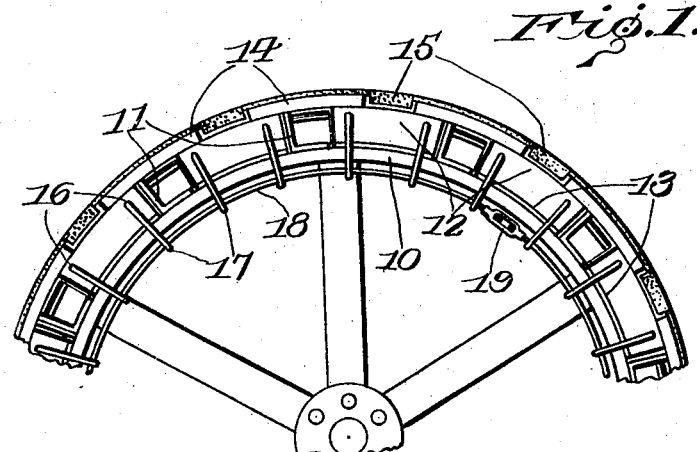
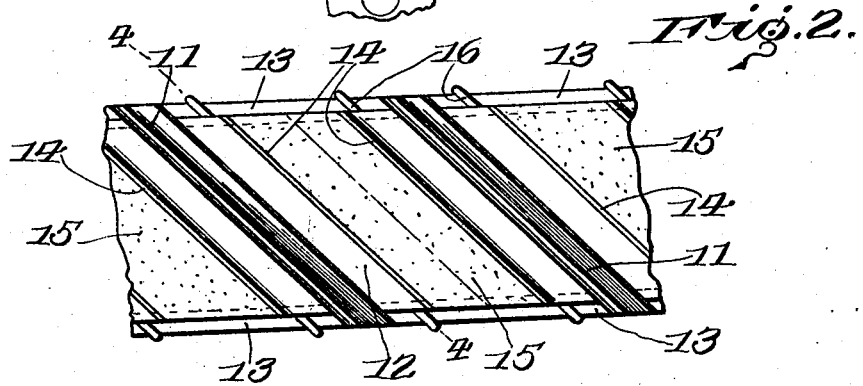
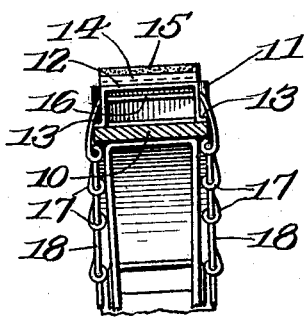
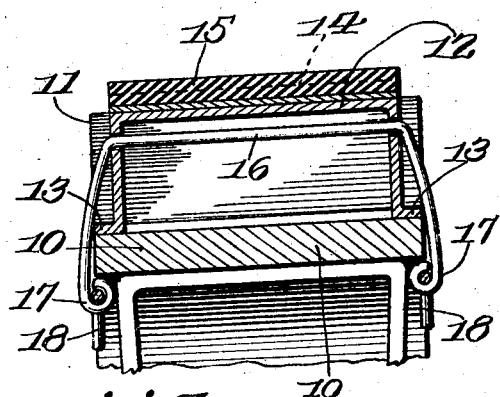
Inventor
Henry B. Turner
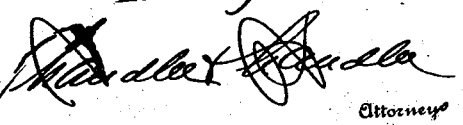

1,413,204. Specification of Letters Patent. Patented Apr. 18, 1922.

Application filed June 13, 1921. Serial No. 477,172.

UNITED STATES PATENT OFFICE.

HENRY B. TURNER, OF SUISUN, CALIFORNIA.

TRACTION-WHEEL TREAD.

*To all whom it may concern:*

Be it known that I, HENRY B. TURNER, a citizen of the United States, residing at Suisun, in the county of Solano, State of California, have invented certain new and useful Improvements in Tractor-Wheel Treads; and I do hereby declare the following to be a full, clear, and exact description of the invention, such as will enable others skilled in the art to which it appertains to make and use the same.

This invention relates to new and useful improvements in treads for vehicle wheels and particularly to auxiliary treads for the wheels of tractors.

The principal object of the invention is to provide a novel and efficient device which, when attached to the tread of a tractor wheel, will effectively prevent the traction lugs from injuring a road or street surface.

Another object is to provide a device of this character which is simple in construction, strong and durable, and which economizes in the use of metal and rubber.

A further object resides in the provision of a strong and durable adjustable securing band for the series of auxiliary tread lugs.

Other objects and advantages will be apparent from the following description when taken in connection with the accompanying drawing.

In the drawing:

Figure 1 is a side elevation of a portion of a tractor wheel showing the invention applied thereto.

Figure 2 is a top plan view of the same.

Figure 3 is a vertical transverse sectional view through the wheel felly, showing one of the attachments in side elevation.

Figure 4 is an enlarged vertical transverse section on the line 4—4 of Figure 2.

Referring particularly to the accompanying drawing, 10 represents the felly of a tractor wheel, having the transverse obliquely extending traction lugs on its tread surface. These lugs 11 injure a road or street surface when a tractor is driven over them, with the result that the road or street is badly cut up. It is the particular object of the present invention to provide a device which will rest on the tread surface of the tractor wheel and project out beyond the outer edge of the lug so that the lug will not contact with the road or street surface.

Between each pair of adjacent lugs of the wheel there is disposed an angular arched metal member 12 having the feet 13 resting on the outer face of the felly of the wheel. This member 12 is rhomboidal in plan view to fit between the obliquely extending adjacent lugs of the wheel. Extending obliquely across the outer face of the member 12, and in parallel relation to each other and to the lugs, 11, are the flanges 14, and between the flanges is disposed and retained a block of rubber 15. This rubber is preferably vulcanized into its place between the flanges 14, so that it will hold more firmly to the member 12. The outer face of the member 12 extends out as far as the outer edge of the lug, while the flanges 14 and the rubber block extend beyond the edge of the lug, whereby the block will contact with the road or street surface, and hold the lugs out of contact therewith.

It will be noted that the ends of the feet of the member 12 extend to the side edges of the felly of the wheel. Extending transversely through the legs of the member 12 are the rods 16 the ends of which are bent downwardly and extend inwardly toward the center of the wheel, for a short distance inwardly of the felly, where they are formed with the eyes 17. These ends and eyes are disposed at opposite sides of the wheel, and engaged through the eyes are the circular rods or rings 18, which have their ends connected by the turnbuckles 19, whereby they may be drawn tight to hold the members 12 firmly on the felly.

What is claimed is:

An attachment for a tractor wheel comprising an arched member disposed between a pair of lugs of the wheel and having feet resting on the tread face of the felly of the wheel, a pair of parallel flanges on the arched member, a rubber block secured between the flanges, and rods disposed transversely through the legs of the arched member and having their ends bent angularly and formed with eyes, and retaining rings disposed through the eyes.

In testimony whereof, I affix my signature, in the presence of two witnesses.

HENRY B. TURNER.

Witnesses:
L. A. TOYS,
P. WHITBY.